June 12, 1934.  W. B. WHITSITT  1,962,977
FIRE EXTINGUISHING AND BRAKE CONTROL MECHANISM FOR RAILWAY CARS
Original Filed May 4, 1931   4 Sheets-Sheet 1
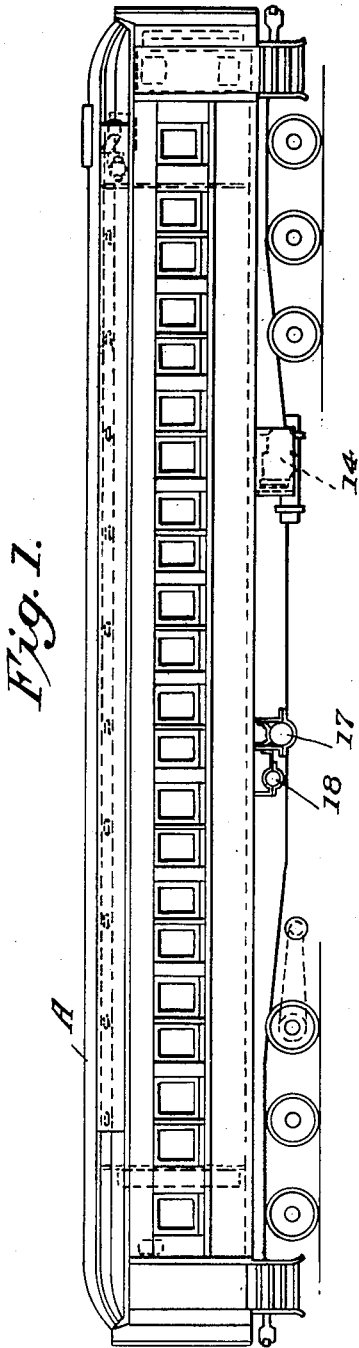
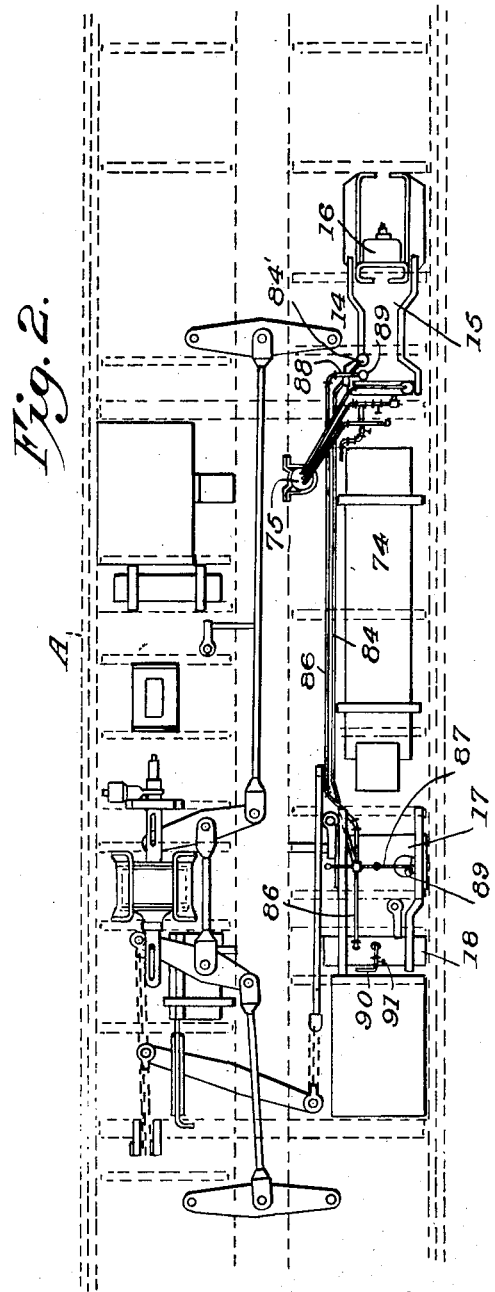
Inventor
WILLIAM B. WHITSITT.
By Edwin S. Clarkson
Attorney June 12, 1934.  W. B. WHITSITT  1,962,977
FIRE EXTINGUISHING AND BRAKE CONTROL MECHANISM FOR RAILWAY CARS
Original Filed May 4, 1931  4 Sheets-Sheet 2
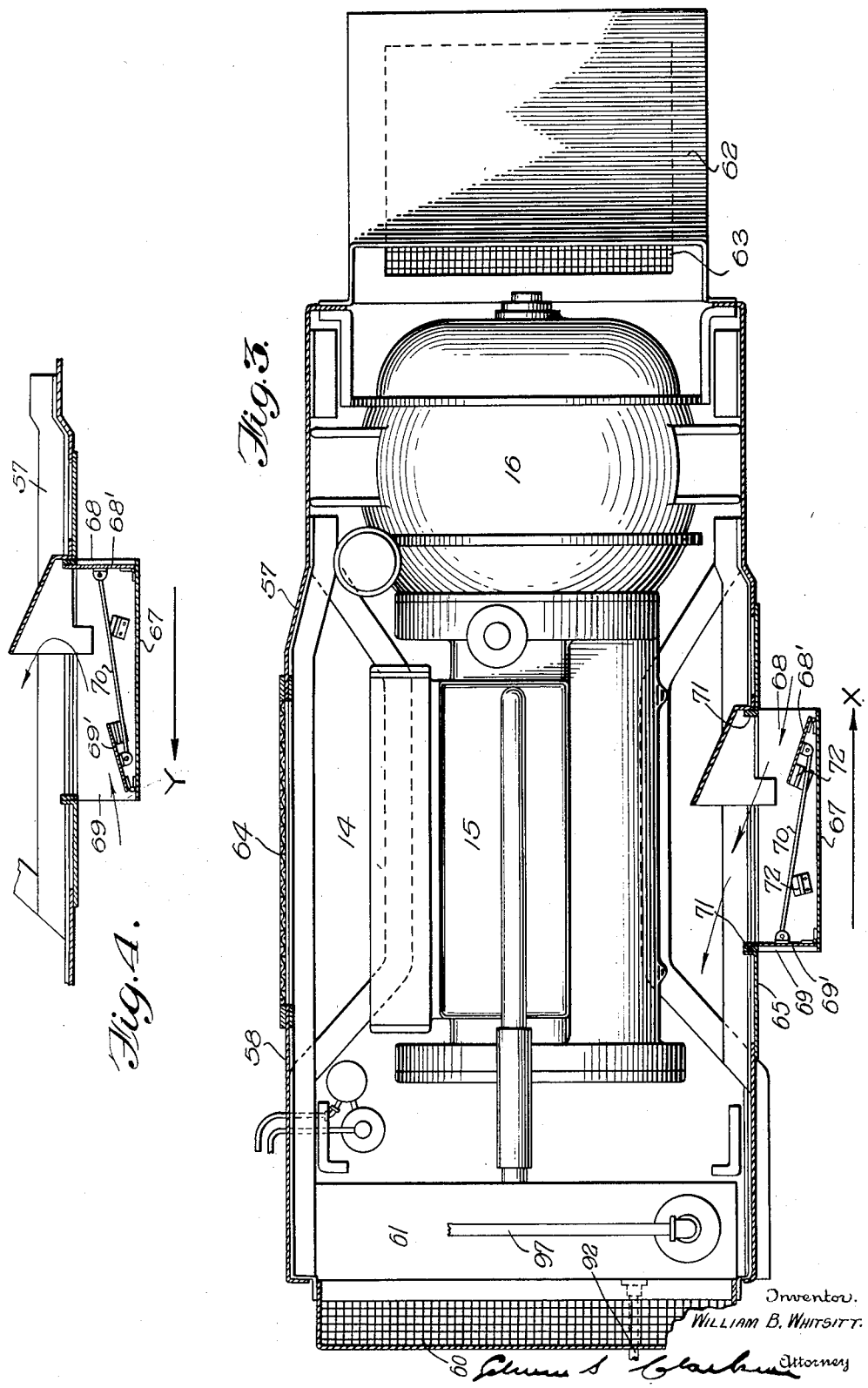

June 12, 1934.  W. B. WHITSITT  1,962,977
FIRE EXTINGUISHING AND BRAKE CONTROL MECHANISM FOR RAILWAY CARS
Original Filed May 4, 1931  4 Sheets-Sheet 3

Inventor
WILLIAM B. WHITSITT

By [signature]
Attorney

June 12, 1934.  W. B. WHITSITT  1,962,977
FIRE EXTINGUISHING AND BRAKE CONTROL MECHANISM FOR RAILWAY CARS
Original Filed May 4, 1931  4 Sheets-Sheet 4

Inventor
WILLIAM B. WHITSITT.

Patented June 12, 1934

1,962,977

UNITED STATES PATENT OFFICE 1,962,977

FIRE EXTINGUISHING AND BRAKE CONTROL MECHANISM FOR RAILWAY CARS

William B. Whitsitt, Baltimore, Md.

Original application May 4, 1931, Serial No. 534,995. Divided and this application February 11, 1932, Serial No. 592,415

6 Claims. (Cl. 169—2)

This application is a division of my prior application Serial No. 534,995, filed May 4, 1931, for Air conditioning apparatus for passenger cars, which application has eventuated into Patent No. 1,882,537, dated October 11, 1932.

This invention relates to fire extinguishing means particularly designed for use in connection with an internal-combustion-engine-generator-set, embodying an electric generator and an internal combustion motor for driving the same, for supplying current to operate the electric driving motors of air conditioning apparatus employed on railway passenger cars, and for other analogous purposes.

The object of the invention is to provide means acting, in the event of accidental injury or leakage of the fuel applying means for the motor, to render the fuel noninflammable or to extinguish escaping portions of fuel which may have become ignited, in order to obviate the liability of a conflagration and consequent damage to the car, together with means acting in the event of the escape of motor fuel and its ignition, and governed by the action of the extinguishing agent, for effecting an operation of the air brake mechanism to bring the train in which the cars are provided with the improved generator driving means to a stop.

With the above and other objects in view, the invention consists of the features of construction, combination and arrangement of parts, hereinafter fully described and claimed, reference being had to the accompanying drawings, in which:—

Fig. 1 is a side elevation of a railway car showing parts of the invention applied thereto.

Fig. 2 is a bottom plan view on an enlarged scale of a portion of a car, the outline and certain structural elements of which are illustrated in dotted lines, showing the elements of the invention mounted on the underside thereof.

Fig. 3 is a plan view of the internal-combustion-engine-generator set or unit, showing the engine cooling air intake nozzle and reversible duplex damper controlling the same in position for admission of air when the car is running in one direction.

Fig. 4 is a view of the engine cooling air intake nozzle showing the damper in position for admitting air when the car is running in the opposite direction.

Figure 5:
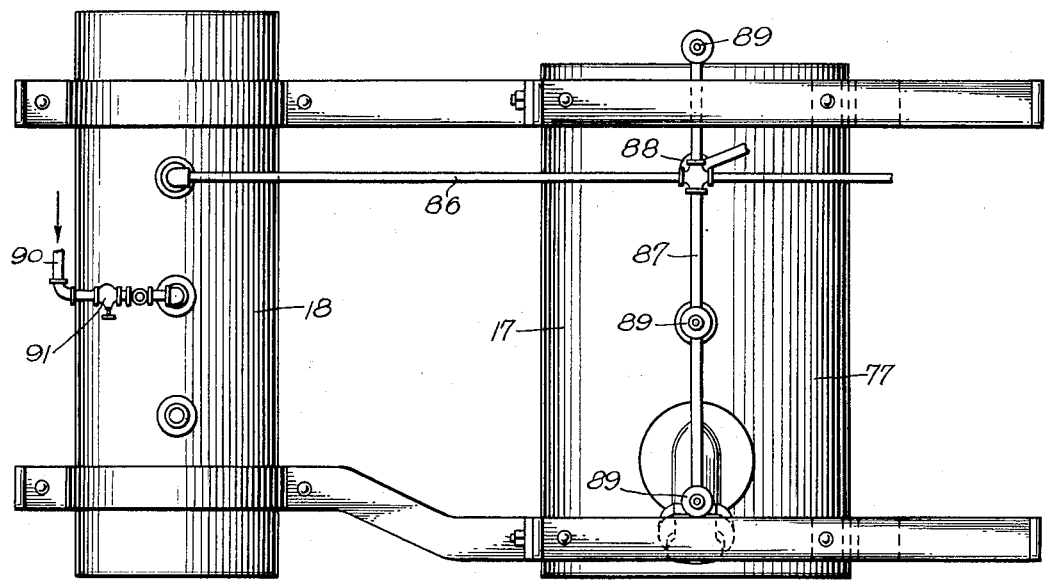
Fig. 5 is a top plan view showing the gasoline and carbon tetrachloride supply tanks and their supports and connections.
Figure 6:
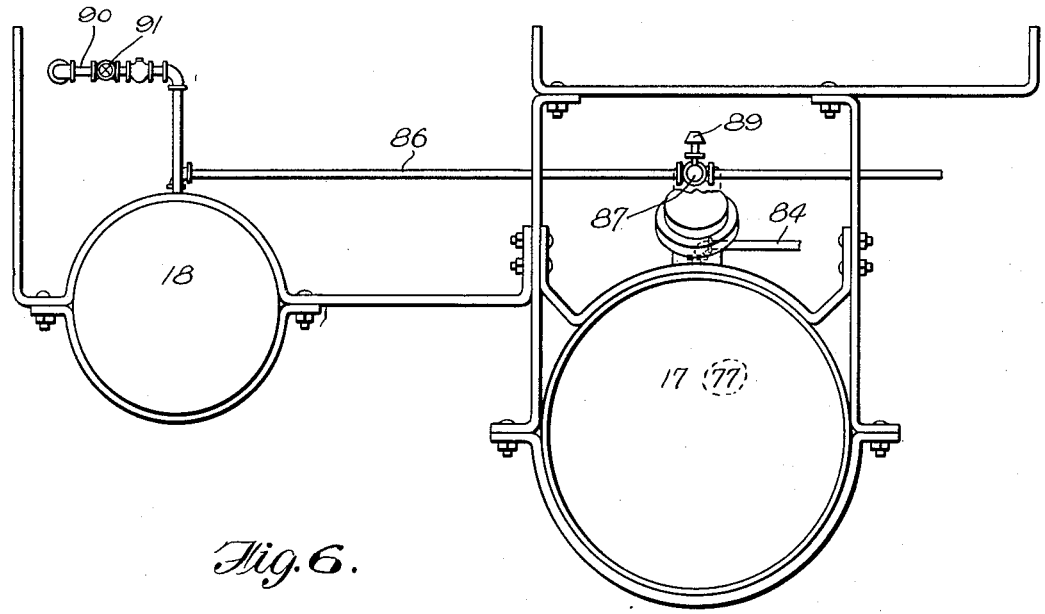
Fig. 6 is a view in elevation of the same.

While the generator set embodying my present invention may be employed for supplying current to operate various devices on a railway car designated A in the drawings, I have shown in the present instance the generator set as arranged for supplying current to operate the driving parts or motors of an air conditioning apparatus, such as disclosed in my application 534,995, above referred to.

The present invention provides an internal-combustion-engine-generator-set or unit 14, including an internal combustion motor 15 and a generator 16, for furnishing electric current at the proper voltage and amperage to driving motors of the mechanism to be operated and other electrical equipment of the car if desired, to ensure operation of the parts to be driven at all times, whether the car is in motion or stationary, and which may be employed in connection with a storage battery or accumulator separate from or forming a part of the ordinary electric current supply circuit of the car.

The present invention also provides a fuel supply and fire extinguishing unit comprising a tank or reservoir 17 for holding gasoline or other similar fuel and a tank or reservoir 18 operatively associated therewith and with the engine generator unit for holding and supplying through suitable means a fire extinguishing fluid, such as carbon tetrachloride. This fuel supply and fire extinguishing unit includes means automatically operable to supply the carbon tetrachloride so as to automatically extinguish any fire which may accidentally occur at the gasoline storage tank or around the internal combustion engine generator 14. The fuel supply and fire extinguishing unit has arranged therein a safety factor means which is automatically set into action on the operation of the carbon tetrachloride supply means for causing the actuation of the air brakes to bring the train to an immediate stop.

The internal combustion engine and generator set is mounted with the fuel feed tank or reservoir and certain water supply tanks or reservoirs upon the underframe of the car. In order to protect the engine generator set from injury by flying missiles in the travel of the train, said engine generator set is enclosed by a protective housing 57. This housing is preferably constructed of side walls 58 (and a top wall if desired) of sheet metal, a bottom screened guard wall 59, of spring screen wire, an end screened guard wall 60, forming a guard for the radiator 61, and an opposite end guard 62 in the form of a downwardly flaring air intake hood communicating at its inner side above its bottom with the housing, said hood being of flaring form toward its bottom and having at its bottom a wire screened air intake opening 63. If desired, one of the side walls 58 may be provided with a ventilation opening covered by a metal screen 64, while the other side wall 58 is provided with an opening normally closed by a hinged door 65 secured in position by a fastening member 66 and which allows access to be obtained to the interior of the housing for inspection, cleaning, repairs or replacement of parts. In the operation of the engine set the cooling air for the radiator is drawn upwardly into the hood 62 into the protective housing, and through the side screen 64, and around the gas engine and through the radiator and out through the radiator guard 60. In order to ensure a positive supply of air to the engine radiator at all times, however, regardless of the direction in which the train may be traveling, there is provided at one side of the protective housing a horizontally disposed air inlet chute 67 normally open at the opposite ends thereof to provide air inlets 68 and 69 and comprising pivoted valve members 68' and 69' coupled for conjoint action by a link or similar connection 70, the valve members being operable by air pressure in the travel of the car in one direction or the other for opening one of the valves and closing the other valve. Each valve is adapted to close against a rubber or other elastic seat bumper 71 and to rest when open upon a suitable supporting bracket 72. When the car is traveling in the direction of the arrow marked X in Fig. 3 valve member 68' is moved by air pressure to uncover the opening 68, while valve member 69' is moved to close the opening 69, so that air will be drawn into the housing through the opening 68 facing in the direction of motion of the car. When the car is traveling in the opposite direction, as indicated by the arrow marked Y in Fig. 4, valve member 69' is moved by air pressure to uncover the opening 69 and valve member 68' is moved to cover opening 68, so that air will enter the housing through an opening 69 facing in the direction of travel of the car. Hence a supply of air is taken into the protective housing, regardless of the direction in which the car is moving, to supplement the air taken in through the hood 62 and screen 64, so that a positive supply of an adequate amount of air will be furnished to the engine and engine radiator.

Figure 7:
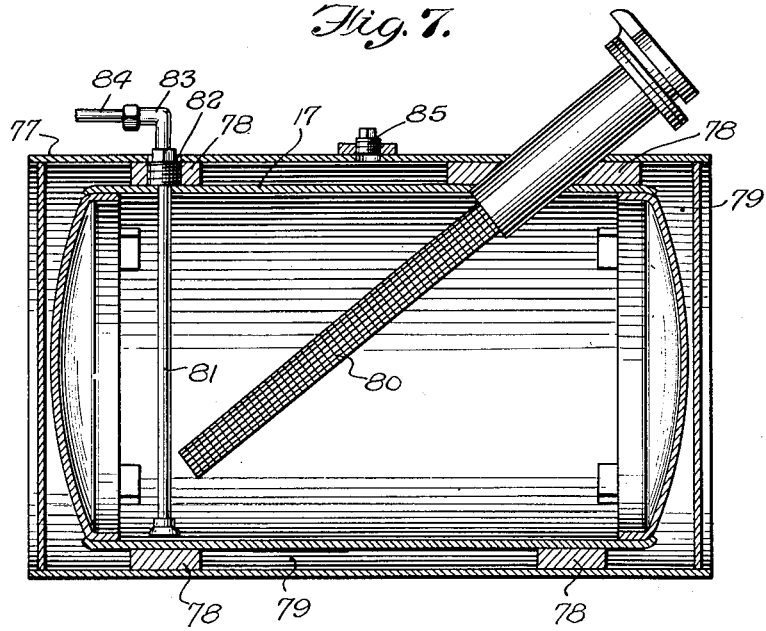
Fig. 7 is a longitudinal section through the gasoline supply tank and its guard jacket or casing.
Figures 8, 9:
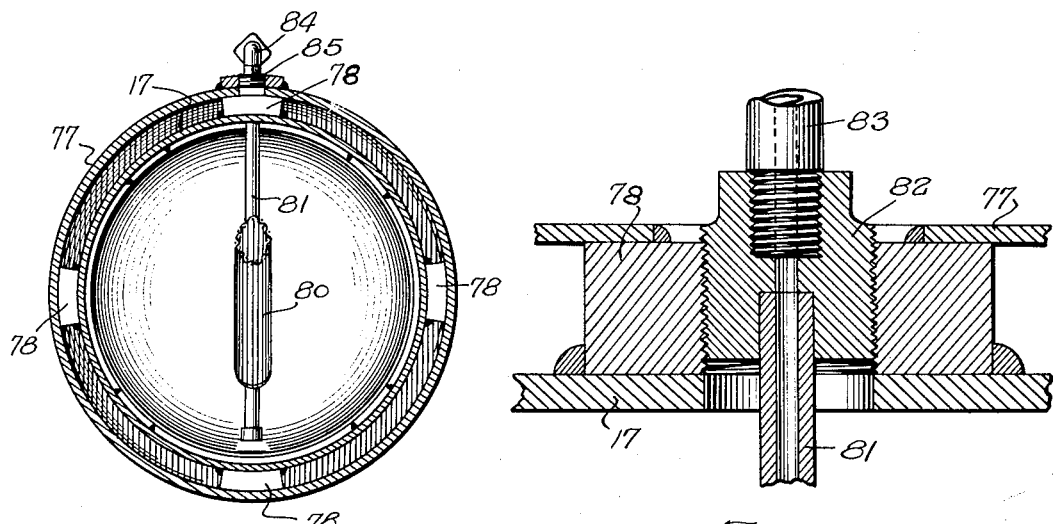
Fig. 8 is a vertical transverse section thereof.
Fig. 9 is a sectional view showing the plug or union connection between the feed pipe sections of the tank shown in Figs. 7 and 8.

Mounted on the car underframe is the tank 17 for supplying gas or other liquid hydrocarbon fuel to the engine and the tank 18 for holding carbon tetrachloride or other fire preventing liquid. The tank 17 is of special construction, as shown in detail in Figs. 7, 8 and 9, being provided with a strong sheet metal enclosing guard jacket or casing 77 spaced therefrom by spacing members 78 disposed between and welded to the tanks so as to leave a space or chamber 79 between the two tanks. This space or chamber is normally filled with the carbon tetrachloride or other fire preventing liquid so that, in case the inner tank 17 should be punctured in an accident, the outer case would also become punctured and any fuel escaping from the inside tank would mix with the charge of tetrachloride in the outside tank and form a non-combustible mixture, thus avoiding liability of fire hazard. The tank 17 is provided with a suitable filling tube 80 and has arranged therein a feed tube 81 extending from a point near the bottom to and outwardly through an opening in the top thereof and secured in a plug 82 fitted in a threaded opening of one of the distance pieces 78 welded to the tanks. In said plug 82 is also fitted an elbow or outlet connection 83 coupling the tube 81 to a feed pipe 84 leading to the carbureter 84' of the engine. The charge of fire extinguishing liquid in the space or chamber 79 is supplied thereto through an opening in the top of the tank 77 which is normally closed by a plug 85. It will be evident that this construction of the fuel tank ensures against the burning of the fuel and starting of a fire in the event of damage to the tank and escape of the fuel therefrom.

The tank 18 is designed to contain carbon tetrachloride or other fire preventing liquid up to a normal predetermined level. From a point near the bottom of this tank upwardly through the tank extends a carbon tetrachloride feed pipe 86 which connects with a spray pipe or sprinkler head 87 overlying the tank 17—77 and continues therefrom toward the engine generator and terminates in a spray pipe or sprinkler head 88 overlying or disposed in working proximity to the engine carbureter. The sprinkler pipes or spray heads 87 and 88 are equipped with automatic sprinkler nozzles 89, such as of Grinnell type, having a valve opening upon the fusion of fusible material at a certain temperature, whereby the fire preventing liquid is allowed to escape and is sprayed upon the part to be protected. With this arrangement it will be seen that in the event that there should be any leakage of the hydrocarbon fuel from the tank 17 or carbureter, and the escaping fuel should take fire, the automatic sprinkler valves will be opened to effect the spraying of the leaky elements with a liquid which will immediately extinguish the flames. The apparatus will, accordingly, be amply safeguarded in the use of a primary motor using a combustible fuel against liability of a fire taking place on account of fuel leakage, as means will be automatically and instantaneously set into action to extinguish the flames and prevent passage of the same to combustible portions of the car. A pipe 90 containing a controlling and cut-off valve 91 is provided for connecting the tank 18 with a train pipe or some other suitable part of the air brake system of the car, so that the carbon tetrachloride liquid will be normally maintained under a pressure of at least one hundred pounds, namely the pressure in the train line, whereby a reliable and certain pressure feed of the liquid to the automatic sprinkler heads is ensured when the sprinkler nozzles are opened for action. This pipe connection 90 is also provided for the purpose of causing a reduction of pressure in the train line simultaneously with the opening of the sprinkler heads for the purpose of setting the air brakes of the train into action to stop the train. By this means the train will be brought to a quick stop soon after any rupture of the fuel supplying means or material escape of fuel and its ignition occurs, to prevent possibility of scattering of the fuel and the starting of a conflagration thereby. This stopping of the train will also advise the train crew that something is wrong with the engine fuel supply means, so that immediate repairs may be made.

From the foregoing, it will be seen that my invention provides an internal combustion motor driven generator whereby current independent of axle driven generators on the train or outside sources of supply at stations may be furnished to ensure operation of the air conditioning or other equipment on the cars under all conditions and whether or not other sources of current are available. Should the gasoline tank or any of the supply connections be disrupted so as to cause leakage of the gasoline or equivalent fuel liquid the fire extinguishing part of the mechanism will be automatically operated to commingle a non-combustible extinguishing liquid with the hydrocarbon fuel or to spray the extinguishing liquid upon parts coated with the fuel, so as to prevent ignition of the fuel or to extinguish the flames if any have started. At the same time the air brake mechanism of the train will be operated to stop the train to prevent any possibility of spread of the fire and to enable repairs to be made and safety ensured before the train again proceeds on its way. The invention therefore not only provides simple, reliable and efficient means for the stated purposes, but also ensures safety of operation under all conditions.

While the structure disclosed is preferred, it will, of course, be understood that changes in the form, proportions, details of construction and arrangement of parts, to suit different circumstances or conditions in practical use, may be made within the scope of the appended claims without departing from the spirit or sacrificing any of the advantages of the invention.

Having thus described my invention, I claim:—

1. In a fire extinguishing system for a passenger vehicle having an air brake system and power apparatus including a combustion motor, a hydrocarbon fuel reservoir for supplying fuel to the motor, a tank containing fire extinguishing liquid, all of said elements being mounted on the underside of the vehicle, means for supplying extinguishing liquid from said tank to the motor parts in the event of leakage and ignition of motive fuel, and means operating upon the discharge of liquid from said tank to set the air brakes.

2. In a fire extinguishing and protective system for a vehicle having air brakes and a power plant including an internal combustion motor on the underside of the vehicle, a hydrocarbon fuel reservoir on the underside of the vehicle, fuel supplying means including a carbureter between the reservoir and motor, a reservoir on the underside of the vehicle containing a fire extinguishing liquid, a connection between said extinguishing liquid reservoir and the air brake system for supplying compressed air to said reservoir, and normally sealed discharge connections from the extinguishing liquid reservoir to the fuel reservoir and motor automatically unsealed thermally in the event of fuel leakage and ignition for discharging extinguishing liquid upon said reservoir and the motor and carbureter and thereby simultaneously causing the application of the air brakes.

3. In a fire extinguishing and protective system for a passenger vehicle having an air brake system and a power plant including an internal combustion motor on the underisde of the vehicle, a fuel supply system for supply of hydrocarbon fuel to the motor, a protective casing surrounding the motor, heat responsive air pressure means supplied with air from the air brake system for supplying a fire extinguishing agent to the surfaces of the motor and casing in the event of leakage and ignition of fuel from the fuel supply system, and means influenced on supply of the extinguishing agent through decrease of air pressure in the air brake system to cause said air brake system to set the brakes.

4. In a fire protective and extinguishing system for a passenger vehicle having an air brake system and a power equipment including an internal combustion motor on the underside of the vehicle, a tank for containing fuel for supply to the internal combustion motor, a tank containing a fire extinguishing liquid, a fusible spray outlet for supplying extinguishing liquid from said extinguishing tank to the motor parts in the event of the leakage and ignition of motor fuel, and air pressure means operating on the unsealing of said outlet for supplying air from the air brake system for discharging the liquid from said extinguishing tank and simultaneously through decrease of pressure in the air brake system causing said system to apply the air brakes of the car.

5. In a fire extinguishing and protective system for a vehicle having air brakes and a power plant including an internal combustion motor mounted on said vehicle, fuel supplying means for the motor including a fuel reservoir, a reservoir for holding a fire extinguishing liquid, heat responsive means for causing flow of said liquid from the liquid reservoir to surfaces of the motor and adjacent surfaces covered by the fuel in case of fuel leakage and ignition, and air pressure means governed by the flow of the liquid from said reservoir for supplying air to discharge said liquid and through a reduction of pressure in the air brake system causing the application of the air brakes.

6. In a fire protective and extinguishing system for a passenger vehicle having an air brake system and a power equipment including an internal combustion motor, a hydrocarbon fuel supply system, a tank containing fire extinguishing liquid, means for causing flow of liquid from said tank to surfaces covered by burning fuel in the event of leakage and ignition of the motor fuel from the fuel supply system, and air pressure means controlled by the discharge of liquid from the tank for supplying air to discharge said liquid and through a reduction of pressure in the air brake system causing the air brake system to set the brakes.

WILLIAM B. WHITSITT.